Sept. 30, 1969   M. J. PURETIC   3,469,819
NET RETRIEVER APPARATUS
Filed Oct. 11, 1967   4 Sheets-Sheet 1

INVENTOR.
MARIO J. PURETIC
BY Fulwider, Patton, Rieber,
Lee and Utecht
ATTORNEYS

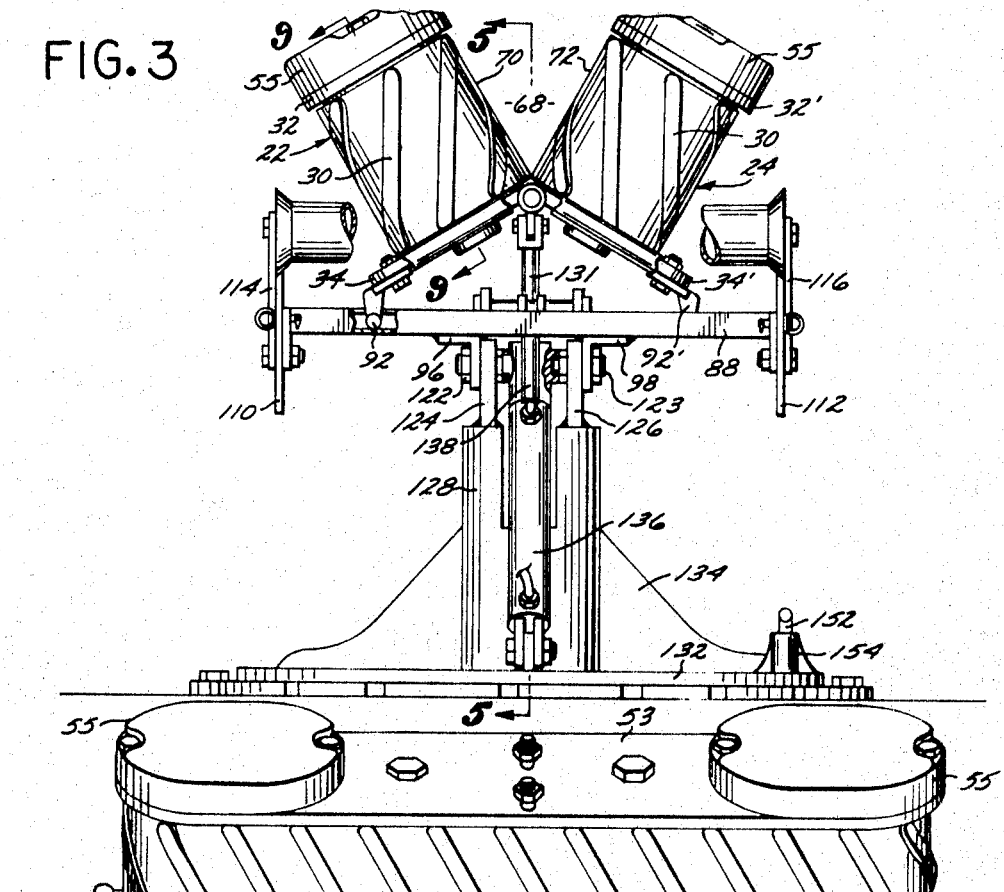

INVENTOR.
MARIO J. PURETIC
BY Fulwider, Patton, Rieber,
Lee and Utecht
ATTORNEYS Sept. 30, 1969  M. J. PURETIC  3,469,819
NET RETRIEVER APPARATUS
Filed Oct. 11, 1967  4 Sheets-Sheet 4

INVENTOR.
MARIO J. PURETIC
BY Fulwider, Patton, Rieber,
Lee and Utecht
ATTORNEYS

United States Patent Office 3,469,819
Patented Sept. 30, 1969

3,469,819
NET RETRIEVER APPARATUS
Mario J. Puretic, 259 6th Ave. N., Monte Cristo Isle,
Tierra Verde, Fla. 33715
Filed Oct. 11, 1967, Ser. No. 674,528
Int. Cl. A01k 73/06, 73/00
U.S. Cl. 254—137                                                7 Claims

ABSTRACT OF THE DISCLOSURE

A retriever for pulling a fishing net from a submerged, expanded fish-catching position onto the deck of a fishing boat in a gathered-together position. The retriever includes a pair of longitudinally-aligned endless belts, the proximate sides of which define a V-shaped gap which receives the net. The belts are supported on a frame. The frame also carries hydraulic motors which concurrently drive the belts in a longitudinal direction. The proximate sides of the moving belts frictionally grip the net to thereby move such net from its fish-catching position in the water to its gathered-together position on the deck of the fishing boat. The frame is supported on the boat deck by means of a pedestal or other structure. The angle between the conveyor belts is adjustable so as to vary the amount of friction applied to the belt. Additionally, the frame is adjustable relative to the deck of the boat to facilitate the net retrieving operation. When the net retriever is not in use, the frame may be pivoted into general longitudinal alignment with the boat to clear the side of the boat thereby facilitating docking and affording free passage along the deck.

BACKGROUND OF THE INVENTION

Field of invention

The present invention relates generally to the field of commercial fishing and more particularly to a net retrieving apparatus adapted to efficiently retrieve a fishing net from a submerged and expanded fish-catching position onto the deck of a fishing boat in a gathered-together position.

Description of prior art

It is known to provide fishing boats with a so-called "power block" for raising a purse seine net from a submerged, expanded fish-catching position to an elevated position above the deck of a boat from where the net is subsequently lowered as a moving column that can be stacked in a desired configuration on the deck. A power block of this type is disclosed in my U.S. Patent No. 2,733,531 issued Feb. 7, 1956. It is also known to retrieve a submerged purse seine net from a submerged fish-gathering position onto the deck of a fishing boat in a gathered-together position by means of a pair of adjacently disposed, generally upwardly extending fairlead members, the space between such fairlead members receiving the fishing net. Such fairlead members are concurrently power rotated in opposite directions. This type of apparatus is disclosed in my U.S. Patent No. 3,069,799, issued Dec. 25, 1962.

SUMMARY OF INVENTION

It is the major object of the present invention to provide a net retriever apparatus which need not be mounted in a position elevated above the deck of a fishing boat.

In most fishing areas there is no objection to using an elevated power block for retrieving a fishing net. In certain areas, however, fishermen are loath to utilize an elevated power block and prefer to retrieve the net from the boat deck. While it is possible to mount the aforedescribed power-operated fairleads of the type disclosed in my Patent No. 3,069,799 on the deck of a fishing boat, the frictional gripping power of such power fairleads may not be adequate in all cases to retrieve a heavily loaded fishing net. The net retrieving apparatus of the present invention affords the advantages of an elevated power block with the advantages of a deck mounting arrangement.

The net retriever apparatus of the present invention utilizes a pair of longitudinally aligned endless belts, the proximate sides of which define a V-shaped gap that receives the net. The belts are supported by frame means carrying power-operated means which concurrently drive the belts in a longitudinal direction, with the proximate sides of the belts frictionally gripping the net to thereby move the net from a fish-catching position to a gathered-together position on the deck. Mounting means are interposed between the frame means and the deck of the boat.

It is another object of the present invention to provide net retriever apparatus of the aforedescribed nature wherein the angle between the belts is adjustable to thereby vary the gripping effect of the belts upon the net.

A further object of the present invention is to provide net retriever apparatus of the aforedescribed nature wherein adjustment means are provided between the frame and the mounting means to vary the angle between the longitudinal axis of said belts and the deck of the fishing boat to thereby facilitate the net retrieving operation.

Yet another object of the present invention is to provide net retrieving apparatus of the aforedescribed nature wherein the frame and its belts may be pivoted from a net retrieving position to a stowed-away position wherein the belts are in general longitudinal alignment with the longitudinal axis of the boat to thereby clear the net retriever apparatus relative to the side of the boat.

A further object of the present invention is to provide net retriever apparatus of the aforedescribed nature which is simple in design, rugged of construction and foolproof in use.

Other objects and advantages of the present invention will become apparent from the following detailed description, when taken in conjunction with the appended drawings.

DESCRIPTION OF THE DRAWINGS

FIG. 3 is a broken front elevational view of said net retriever apparatus;

FIG. 4 is a side elevational view of said net retriever apparatus;

DESCRIPTION OF THE PREFERRED EMBODIMENT

Figure 1:
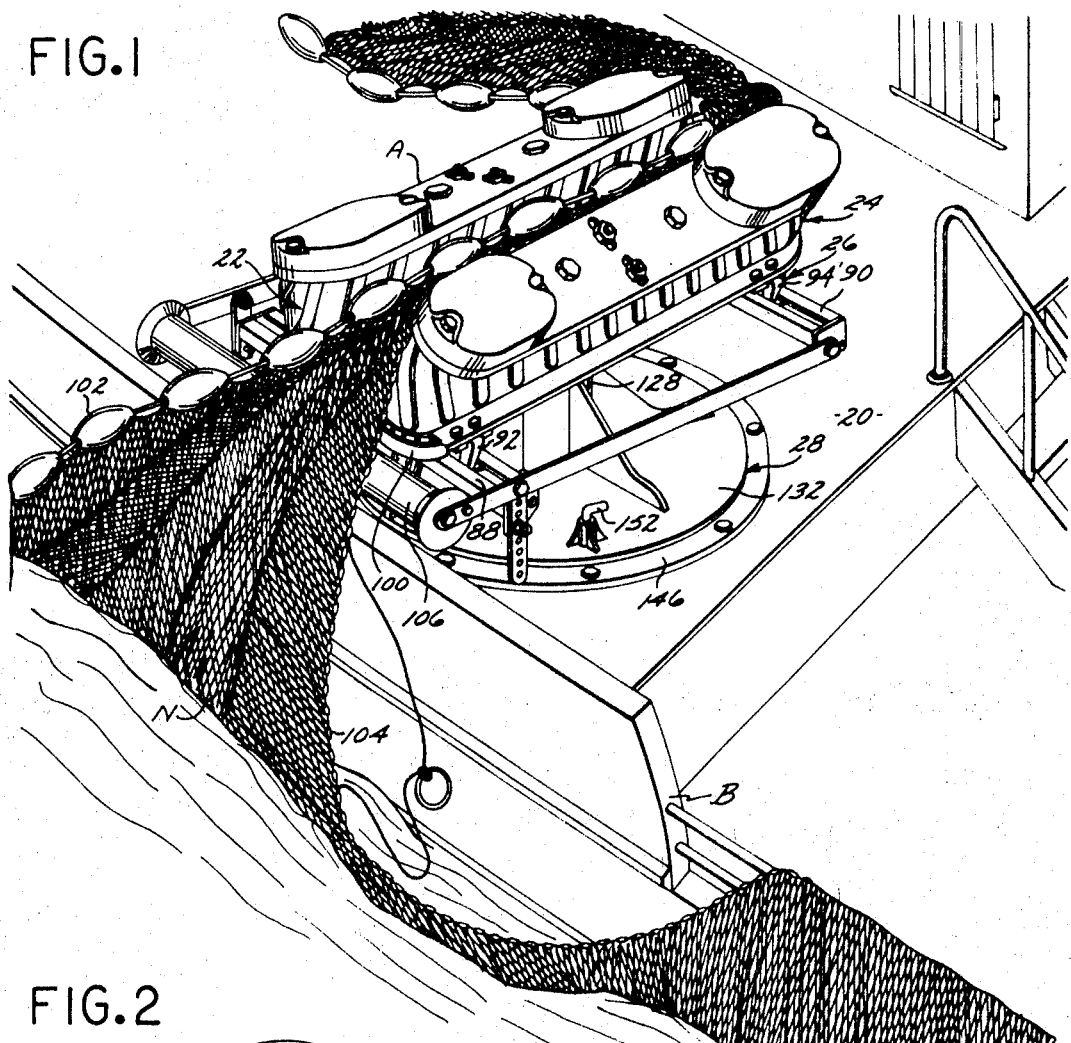
FIG. 1 is a perspective view showing a prefered form of net retrieving apparatus embodying the present invention mounted on the deck of a fishing boat during a net retrieving operation.

Referring to the drawings and particularly FIG. 1 thereof, there is shown a preferred form of net retriever apparatus A embodying the present invention mounted on the deck 20 of a fishing boat B. The net retrieving apparatus A is shown pulling a fish net N from a submerged, expanded fish-catching position onto the deck 20 in a gathered-together position. The net retriever apparatus A includes a pair of longitudinally aligned endless belts, generally designated 22 and 24. The proximate sides of the belts 22 and 24 define a generally V-shaped gap that receives the net N. The belts 22 and 24 are supported on frame means, generally designated 26. The frame means also support power-operated means not visible in FIG. 1 which concurrently drive the belts 22 and 24 in a longitudinal direction, with the proximate sides of the belts frictionally gripping the net to thereby move the net from its fish-catching position to its gathered-together position, as indicated by the directional arrows in this figure. Mounting means, generally designated 28, are interposed between the frame means 26 and the deck 20 of the fishing boat B.

Figure 12:
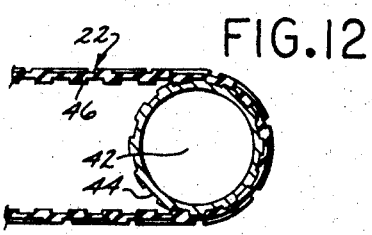
FIG. 12 is a sectional view taken along line 12—12 of FIG. 6.

More particularly, and with additional reference to the other figures of the drawings, the conveyor belts 22 and 24 are preferably formed of a synthetic rubber material. It is desirable that the exterior faces of the conveyor belts be provided with integral cleats 30. The frame means 26 supporting belt 22 include upper and lower plates 32 and 34 of like configuration. The plates 32 and 34 are maintained in rigid, parallel spaced-apart relationship by spacers 36 and 38. The front portions of the top and bottom plates 32 and 34 support front drive rollers 40, while the rear portions thereof support rear drive rollers 42. The belt 22 is carried upon the aforementioned front and rear drive rollers 40 and 42. Preferably, as indicated particularly in FIG. 12, the periphery of the drive rollers are each formed with longitudinally extending grooves 44 that interfit complemental tongues 46 formed on the inner surfaces of the conveyor belt so as to effect maximum transfer of power from the rollers to the belt.

Figure 5:
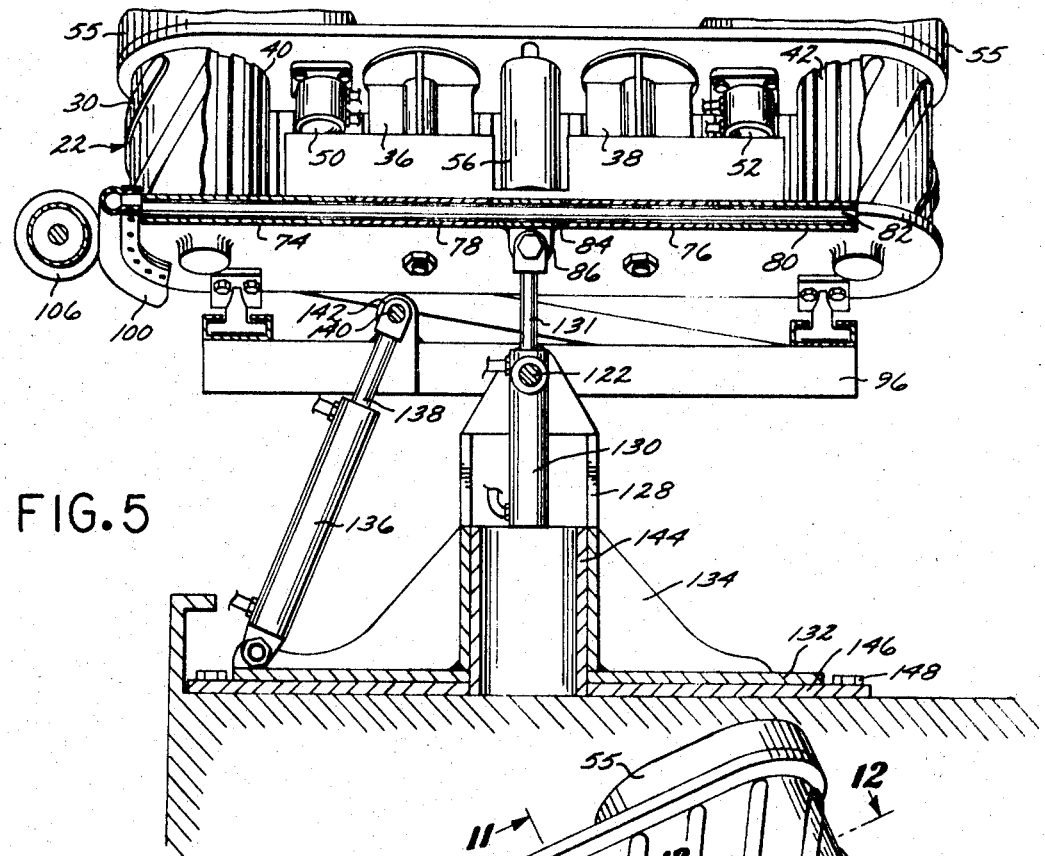
FIG. 5 is a vertical sectional view taken on line 5—5 of FIG. 3 and partially broken away in the interest of clarity.
Figure 9:
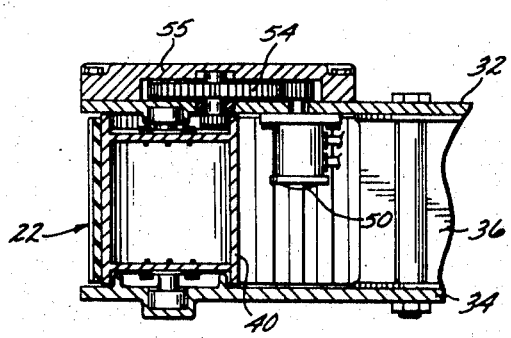
FIG. 9 is a sectional view taken along line 9—9 of FIG. 3.

As shown particularly in FIGS. 5 and 9, the front and rear drive rollers 40 and 42 are each driven by front and rear hydraulic motors 50 and 52. As indicated particularly in FIG. 9, suitable conventional gearing 54 is interposed between the drive shaft of each hydraulic motor and its respective drive roller. Cover plates 55 are provided for gearing 54.

Figure 10:
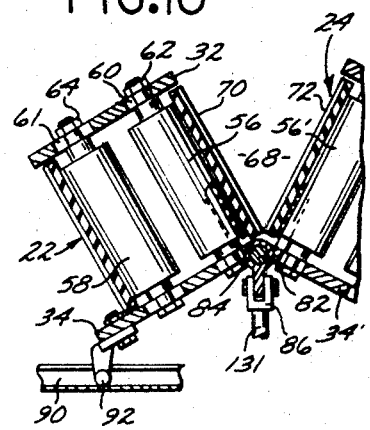
FIG. 10 is a sectional view taken along line 10—10 of FIG. 6.

The intermediate portions of the top and bottom plates 32 and 34 support inner and outer idler rollers 56 and 58, shown particularly in FIG. 10. These idler rollers 56 and 58 are adjustable in a transverse direction relative to the longitudinal axis of conveyor belt 22 so as to afford adjustment of the tension of such belt. Such adjustment is obtained by providing the top and bottom plates 32 and 34 with transversely extending slots 60 and 61 that receive the upper and lower ends of the mounting posts 62 and 64, respectively, of the idler rollers 56 and 58.

The support plates carrying the conveyor belt 24 as well as the parts associated with such plates are of identical construction with the support plates 32 and 34 and associated parts that operate conveyor belt 22. Accordingly, these frame means and associated parts bear primed reference numerals in the drawings.

Figure 11:
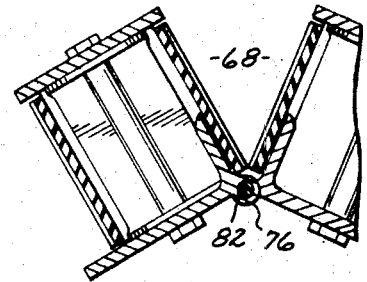
FIG. 11 is a sectional view taken along line 11—11 of FIG. 6.

The lower plates 34 and 34' of the frame means 26 are pivotally interconnected along their longitudinal axis so as to thereby permit adjustment of the V-shaped gap 68 defined by the proximate surfaces 70 and 72 of the conveyor belts 22 and 24. Thus, the lower plate 34 is formed with integral hinge tubes 74 and 76 which longitudinally interfit complementary hinge tubes 78 and 80 integrally formed on the inner end of the opposite lower plate 34' as shown particularly in FIGS. 5, 6 and 11. With continued reference to these figures, an elongated hinge bar 82 is telescopically received within the aforementioned hinge tubes. The central portion of the hinge bar 82 is supported within a hinge sleeve 84 carried by the upper end of a bracket 86, as indicated particularly in FIGS. 6 and 10.

Figure 6:
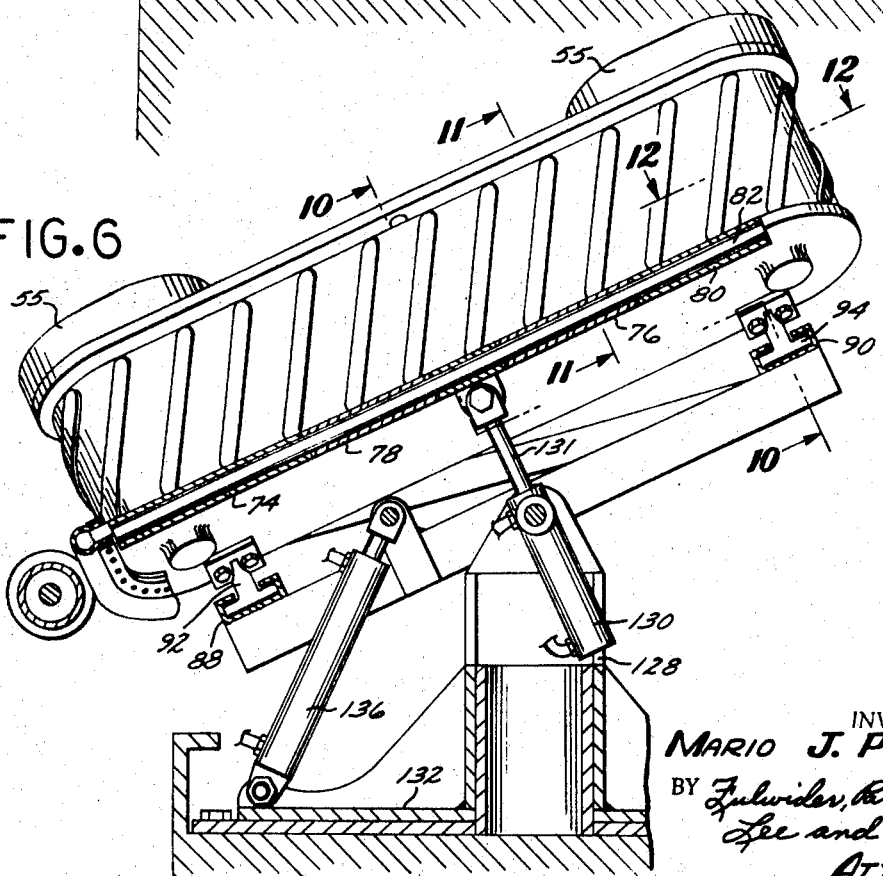
FIG. 6 is a view similar to FIG. 5 but showing the parts of said apparatus in a different operative position.

The outer portions of the lower support plates 34 and 34' are supported by front and rear transverse channels 88 and 90, as indicated particularly in FIGS. 3, 6 and 10. These channels 88 and 90 are open-topped to receive downwardly extending slider elements 92, 92' and 94, 94' which are bolted to the outer portions of the lower support plates. As these plates undergo pivotal movement relative to one another the slider elements move transversely within the channels 88 and 90. The channels are rigidly interconnected by a pair of longitudinally extending channels 96 and 98.

Preferably, the front portion of the lower support plates 34 and 34' carry a transversely extending resilient guide tube 100 for facilitating entrance of the net N and its associated float line 102 and lead line 104 into the V-shaped gap 68. It is also desirable that a horizontal transverse guide roller 106 be positioned forwardly and downwardly of the conveyor belts 22 and 24 to further facilitate guiding of the net N and its associated parts into the V-shaped gap defined by the conveyor belts. The guide roller 106 is rotatably carried by the front end of a pair of longitudinally extending support arms 110 and 112. The rear end of these support arms 110 and 112 are pivotally secured to the rear transverse channel 90. The front transverse channel 88 carries a pair of vertical adjustment links 114 and 116 the upper end of which are pivotally affixed to the front portion of the support arms 110 and 112. The links 114 and 116 are formed with vertically spaced bores 118 for selectively receiving an adjustment pin 120 that extends into a complementary bore formed on the front transverse channel 88.

As indicated particularly in FIG. 3, the longitudinal channels 96 and 98 depend from the intermediate portions of the transverse channels 88 and 90 at points spaced equidistantly outwardly from the center of the transverse channels. The midportion of the longitudinal channels are each bored to receive a horizontal pivot pin 122, 123. Such pivot pins 122, 123 also extend through a pair of upstanding ears 124 and 126 formed on the upper portion of a pedestal 128. Between the ears 124 and 126 the aforementioned pivot pins 122 and 123 support the upper portion of a hydraulic cylinder 130, which can be termed a gap angle adjustment cylinder having a plunger 131. The upper end of this plunger is secured to the aforementioned bracket 86.

The lower end of the pedestal 128 is rigidly affixed, as by welding, to a circular adjustment plate 132. A plurality of gussets 134 extend between the pedestal 128 and the aforementioned plate 132. The front portion of the front gusset 134a is pivotally affixed to the lower end of a hydraulic tilting cylinder 136. A plunger 138 extends upwardly from the tilting cylinder 136 aind has its upper end pivotally connected to a horizontal pivot pin 140 carried by brackets 142. The brackets 142 are formed on the longitudinal channels 96 and 98 intermediate their midportion and front ends. It will be apparent that actuation of the plunger 138 of the tilting cylinder 136 will serve to tilt the longitudinal channels 96 and 98 about the horizontal pivot pin 122.

The pedestal 128 forms part of the mounting means and is rotatably supported upon an upstanding post 144 disposed within a centrally apertured, circular mounting plate 146 that is secured to the boat deck 20 by bolts 148, as shown in FIG. 5. As indicated particularly in FIG. 1 and FIG. 4, the mounting plate 146 is formed with a plurality of circumferentially spaced bores 150 which selectively receive the lower end of a generally L-shaped locking pin 152. The locking pin 152 is vertically slidably carried by a tubular holder 154 that is rigidly affixed to the upper surface of the adjustment plate 132. With this arrangement, the pedestal 128 may be adjusted to a desired angular position relative to the mounting plate 146 and thereafter locked against rotation relative to such mounting plate by positioning the locking pin 152 within the desired bore 150.

Figure 2:
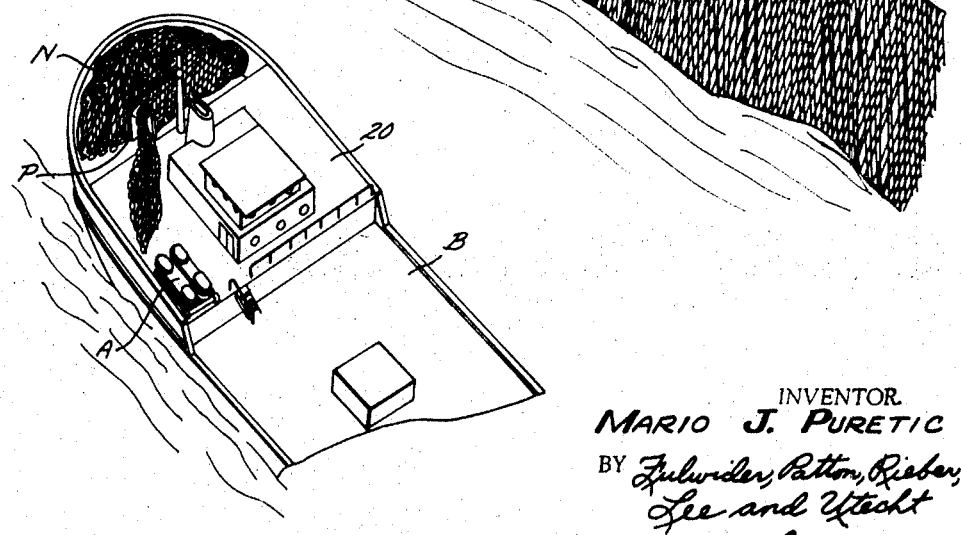
FIG. 2 is a fragmentary perspective view in reduced scale showing said net retriever apparatus stowed in a space-saving position.

In operation of the aforedescribed net retriever apparatus A, such apparatus will be moved from its stowed position shown in FIG. 2 into its net retrieving position shown in FIG. 1 by lifting the locking pin 152 and thereafter rotating the pedestal 128 and its attached parts into generally transverse alignment with respect to the longitudinal axis of the boat B. Thereafter, the locking pin 152 will be positioned within the bore 150 in closest vertical alignment with such locking pin. It should be particularly noted that the provision of this locking arrangement makes it possible to position the belts 22 and 24 which their longitudinal axis disposed at the angle most desirable for efficient retrieval of the net N. It is also possible by removing the locking pin 152 to allow the belts 22 and 24 to freely swing with the net.

With the longitudinal axis of the belts 22 and 24 disposed at the desired angle relative to the net N, one end of the net including its float line 102 and lead line 104 is manually deposited within the gap 68 defined between the proximate sides of the belts 22 and 24. The motors 50 are then actuated so as to effect longitudinal movement of the belts 22 and 24 inwardly relative to the side of the boat B from which the net N extends. The proximate surfaces of the belts will frictionally grip the net N to thereby move it from its submerged fish-catching position upwardly onto the deck 20 of the fishing net. During this operation, the hydraulic tilting cylinder 136 may be actuated so as to vary the vertical angle between the longitudinal axes of the belts and the boat deck to thereby effect most efficient retrieval of the net. In the event the net is strained the tilting cylinder will generally be actuated so as to lift the front end of the belts, while this operation will be reversed if it is desired to "square the net."

The angle between the proximate sides of the belts 22 and 24 is adjusted by means of the gap angle adjustment cylinder 130. Thus, upward movement of the plunger 131 of this cylinder will serve to raise the inner edges of the support plates 34 and 34' to thereby decrease the angle of the gap 68, while downward movement of such plunger will serve to increase this angle. The angle will be reduced when it is desired to increase the friction being applied to the net by the belts 22 and 24. Additionally, in general the lesser the bulk of the net the less the angle need be, while conversely the greater the net bulk the greater will be the angle of the gap 68.

It will be understood that control over the operation of the tilting cylinder 136 and the gap angle adjustment cylinder 130 will be effected by conventional hydraulic valving. Similarly, suitable conventional hydraulic controls will be provided for the motors 50. In this regard, it may be advantageous under certain conditions to adjust the speed of the belts 22 and 24 such that one belt will move faster than the other belt. This permits control over the speed of retrieval of the different sections of the net.

Figure 7:
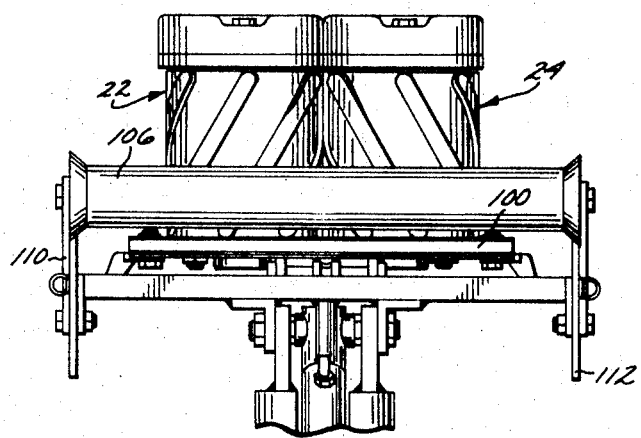
FIG. 7 is a broken front elevational view of said apparatus with the parts thereof arranged in a position corresponding to that shown in FIG. 2.
Figure 8:
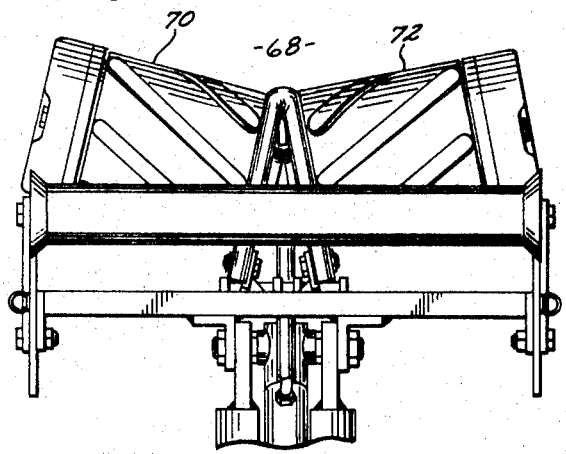
FIG. 8 is a view similar to FIG. 7 but showing the parts of said apparatus disposed in a position for retrieving a net.

With reference again to FIG. 2, the net retriever apparatus of the present invention is advantageously used with a power block of the type shown in my aforementioned U.S. Patent No. 2,733,531, such block designated P in this drawing. When so employed, the net N is fed from the rear of the net retriever apparatus A through the power block P. The use of the power block P makes it possible to conveniently stack the net N on the rear deck of the fishing boat. It should also be particularly noted that in freezing weather the use of the aforedescribed net retriever apparatus makes it possible to squeeze most of the water out of the net N and thereby remove the danger that the stacked net will become a frozen unusable mass. Referring to FIG. 7, it is possible to utilize the belts 22 and 24 to draw in light nets, ropes and lines by closing the gap between the belts to the position shown in this figure.

At the conclusion of the net retrieving operation, the locking pin 152 will again be lifted and the pedestal 138 rotated so as to generally align the longitudinal axis of the belts 22 and 24 with the longitudinal axis of the boat B. In this position, the side of the boat B will be cleared thereby facilitating docking and providing freer passage along the boat deck 20.

While there has been shown and described hereinbefore what is presently considered to be the preferred embodiment of the present invention, it will be apparent that various changes and modifications may be made.

I claim:

1. Net retriever apparatus for use in pulling a fish net from an expanded fish-catching position onto the deck of a fishing boat in a gathered-together position, comprising:
   a pair of longitudinally-aligned endless belts, the proximate sides of which define a generally V-shaped gap that receives said net;
   frame means supporting said belts;
   power-operated means on said frame means for concurrently driving said belts in a longitudinal direction with the proximate sides of said belts frictionally gripping said net to thereby move said net from said fish-catching position to said gathered-together position;
   adjustment means operatively connected with said frame means to adjust the angle defined between the proximate sides of said belts to thereby vary the gripping effect of said belts upon said net;
   and mounting means interposed between said frame means and the deck of said fishing net.

2. Net retriever apparatus as set forth in claim 1 wherein the vertical angle between the longitudinal axis of said belts and the deck of said fishing boat may be varied.

3. Net retriever apparatus as set forth in claim 1 wherein the front portion of said frame means is provided with a guide roller transverse to the longitudinal axis of said belts.

4. Net retriever apparatus as set forth in claim 1 wherein said mounting means includes a pedestal rotatable about a vertical axis on said deck and lock means for adjusting the relative rotational position of said pedestal relative to said deck.

5. Net retriever apparatus as set forth in claim 1 wherein said angle is varied by means of a fluid-actuated cylinder and plunger interposed between said frame means and said mounting means.

6. Net retriever apparatus as set forth in claim 2 wherein said vertical angle is varied by means of a fluid-actuated tilting cylinder and plunger interposed between said frame means and said mounting means.

7. Net retriever apparatus as set forth in claim 6 wherein said mounting means includes a pedestal rotatable about a vertical axis on said deck and lock means for adjusting the relative rotational position of said pedestal relative to said deck.

References Cited

UNITED STATES PATENTS

| | | | |
|---|---|---|---|
| 1,216,530 | 2/1917 | Williams | 254—137 |
| 3,069,799 | 12/1962 | Puretic | 43—8 |
| 3,104,791 | 9/1963 | Anrig | 226—172 |
| 3,305,218 | 2/1967 | Bjorshol | 254—137 |

FOREIGN PATENTS 344,205  11/1921  Germany.

EVON C. BLUNK, Primary Examiner
HARVEY C. HORNSBY, Assistant Examiner

U.S. Cl. X.R.

43—8; 226—172